(12) United States Patent  (10) Patent No.: US 7,246,712 B2
Baker                      (45) Date of Patent:    Jul. 24, 2007

(54) LOGGING CARRIAGE WITH TOWLINE-OPERATED GRAPPLE

(76) Inventor: Scotty Baker, 62500 Commerce Rd., LaGrande, OR (US) 97850

( * ) Notice: Subject to any disclaimer, the term of this patent is extended or adjusted under 35 U.S.C. 154(b) by 99 days.

(21) Appl. No.: 11/114,714

(22) Filed: Apr. 25, 2005

(65) Prior Publication Data
US 2006/0237385 A1    Oct. 26, 2006

(51) Int. Cl.
B66C 21/00 (2006.01)

(52) U.S. Cl. .............................. 212/78; 212/94; 212/96

(58) Field of Classification Search .................. 212/78, 212/89–99
See application file for complete search history.

(56) References Cited

U.S. PATENT DOCUMENTS

| | | | |
|---|---|---|---|
| 1,931,700 A | 10/1933 | Murphy et al. ................ 49/17 |
| 3,245,712 A | 4/1966 | Mitchell ..................... 294/112 |
| 3,463,329 A | 8/1969 | Gartner ......................... 214/1 |
| 3,540,770 A | 11/1970 | Mitchell ..................... 294/111 |
| 3,582,127 A | 6/1971 | Johnson ...................... 294/112 |
| 3,647,255 A | 3/1972 | Hale et al. .................. 294/111 |
| 3,651,952 A | 3/1972 | Mitchell ....................... 212/84 |
| 3,690,716 A | 9/1972 | Johnson ...................... 294/111 |
| 3,695,672 A | 10/1972 | Mitchell ..................... 294/112 |
| 3,976,322 A | 8/1976 | Johnson ...................... 294/111 |
| 4,449,634 A | 5/1984 | Buzzichelli et al. ........ 212/196 |
| 4,515,281 A | 5/1985 | Maki ........................... 212/76 |
| 4,687,109 A * | 8/1987 | Davis .......................... 212/76 |
| 5,088,610 A | 2/1992 | Garnier ...................... 212/196 |
| 5,097,972 A * | 3/1992 | Gladhart ..................... 212/122 |
| 5,107,997 A * | 4/1992 | Worsley ....................... 212/89 |
| 5,653,350 A | 8/1997 | Maki ........................... 212/84 |
| 6,189,455 B1 | 2/2001 | Thompson .................. 104/112 |
| 6,517,131 B1 | 2/2003 | Haataja .................... 294/82.15 |

* cited by examiner

*Primary Examiner*—Thomas J. Brahan
(74) *Attorney, Agent, or Firm*—Pedersen & Co., PLLC; Ken J. Pedersen; Barbara S. Pedersen

(57) ABSTRACT

A logging system including a yarder, a skyline, a towline, a carriage riding on the skyline, and a grapple depending from the carriage for grabbing logs and carrying them back to a landing. The carriage and grapple are moved along the skyline for positioning the grapple above a log(s). A remote control device for controlling the slackening and tightening of the skyline and towline, as well as the turning and opening and closing of the grapple. The towline is attached to the grapple, so that when the operator signals the tightening of the towline, the grapple closes around the log.

12 Claims, 14 Drawing Sheets

LOGGING CARRIAGE WITH TOWLINE-OPERATED GRAPPLE

BACKGROUND OF THE INVENTION

1. Field of the Invention

The present invention relates to logging equipment, and more specifically, to remote controlled skyline logging carriages. The invention further relates to a grapple on a logging carriage that is operated by a towline.

2. Related Art

The traditional concern of a logging operation is the efficient and cost effective transportation of felled timber from a forest to the processing plants. In recent years, modern loggers are also concerned with minimizing the safety hazards and environmental damage resulting from logging. Thus, loggers may opt to selectively harvest timber instead of clear cutting, because clear cutting typically requires expensive electrically- or diesel-powered carriages. Therefore, it is important that modern logging equipment be designed to be used in either clear-cutting or selective harvesting situations. Also, it is important to design logging equipment that is easy and inexpensive to manufacture.

When harvesting logs along, or at the bottom of, steep slopes or hauling logs over longer distances, a cable yarding system is often employed, in which a cable known as a skyline is stretched between two spars to extend over sloped terrain; one spar is at a higher point than the other. One of the spars is usually a yarder or yoader (an excavator-based cable yarder without guylines to stabilize the machine itself (http://www.cbs.state.or.us/external/osha/pdf/grants/osu/evaluatesynthroperigging.pdf)). A carriage equipped with grooved wheels or "sheaves" rides on the skyline cable to carry logs to a landing position near one of the spars. A landing is a generally level area, situated near a logging road, at which logs are debarked and delimbed and loaded on trucks and hauled to processing plants. Typically, a second cable, known as a towline, skidline, or mainline, extends from the uphill spar to the carriage. The towline is reeled in to pull the carriage uphill, and paid out as the carriage moves downhill due to gravity. The skyline system may comprise additional lines, such as a haulback line separate from the skyline or towline (see U.S. Pat. No. 3,695,672). The addition of multiple lines results in the need for additional drums on the yarder for tensioning and slackening the lines. Additional drums increase the complexity and the capital cost of the yarder, and the increased complexity requires a greater skill level on the part of the worker.

The present invention relates to two-drum cable yarding systems in which the yarder includes a first drum or winch connected to the skyline cable. The first winch pays out the skyline cable to lower the skyline and, at the same time, the carriage is allowed to roll by gravity down the skyline. The yarder also includes a second drum or winch connected to a towline cable, and, as the skyline is being lowered, the carriage is pulling out the towline. Once the carriage is lowered toward the logging area due to gravity and the lowering of the skyline, it is secured at a desired location, usually by means of a brake that fixes the carriage in position relative to the skyline and by control of the first winch to stop payout of the skyline. When it is time to bring the log(s) back to the landing, the towline is pulled back toward the yarder using the second winch, and the skyline is also raised and pulled back toward the landing, resulting in the carriage and logs being raised and pulled back to the landing.

In cable yarding, the carriage may be fitted with a grapple which closes around the log to pick the log up and bring it back to the landing. The use of grapples has reduced the number of workmen required on the slope or in the valley securing the logs with chokers (steel cables used for yarding logs). However, one of the problems existing in the field of carriages having grapples is how to minimize the cost and the operation of the grapple to effectively and inexpensively pick up the log and convey it to another desired location and then release it. There are grapple carriages that use a diesel engine inside the carriage to operate the carriage and the grapple; however, engine-powered grapple carriages are very expensive to manufacture.

In order to reduce the cost of manufacturing a grapple carriage, loggers have designed grapple carriages that use only pulleys and lines to operate the carriage and grapple. For example, Mitchell (U.S. Pat. No. 3,695,672), discloses a carriage 210 mounted on a skyline 212 and a pair of cables 238 and 236 which each extend over a pulley within the carriage. Cable 236 is used to operate the grapple, and cable 238 is used to pull the carriage 210 back to the landing. While this grapple carriage eliminates the need for a diesel engine, it requires a three-line system to operate the grapple and carriage, which necessitates three drums on the yarder, in turn adding to the expense of the logging operation.

In order to reduce the cost of the yarder, loggers have preferred to use two-line systems in which there is a skyline and a towline or mainline. Mitchell (U.S. Pat. No. 3,540,770) discloses a grapple carriage that is suspended from a skyline, wherein a mainline is connected with the carriage for moving it along the skyline. Although Mitchell uses only this two-line system (skyline and mainline) for moving the carriage between the landing and the logs, Mitchell must use an additional line inside the carriage to operate the grapple. This cable is mounted to the housing of the carriage and extends down through a grommet or adapter in the bottom wall of the carriage and connects with the grapple. An internal combustion engine, a storage battery, and an FM radio receiver in the carriage are used to operate the cable to open the grapple. When the cable is released, the normal weight of the jaws will cause the jaws to move inwardly due to the normal force of gravity, and the jaws will close. The internal combustion engine is very expensive. Additionally, the power used to operate the grapple is only the power that can be generated by the internal combustion engine and the cable connected inside the carriage. The loggers do not want the carriage to be too large; therefore, they require a small engine and the power generated is often insufficient to open a grapple, especially a grapple that is large enough for a turn of multiple logs.

Therefore, there is still a need for an inexpensive grapple carriage that does not require an internal combustion engine. The inventor believes that a grapple carriage is needed that does not require a third line to operate the grapple and that can be operated by one person.

SUMMARY OF THE INVENTION

The present invention is a logging system, and more specifically, a logging system comprising a skyline cable, a towline cable, and a carriage riding on the skyline cable from which a grapple is suspended. The towline cable is preferably connected to the grapple, and the grapple is closed, by tightening the towline, in order to pick up and transfer a single log or a turn of logs to a landing zone. In the preferred embodiment, a remote control device operates one or more brakes on the carriage in order to control the movement of the grapple carriage relative to the skyline and/or towline, and to clamp the towline in a way that locks the grapple in a closed position. In the preferred embodiment, the remote control device also operates a motor for swiveling the grapple to an optimum position for grasping a log(s).

DESCRIPTION OF THE PREFERRED EMBODIMENTS

Figure 1:
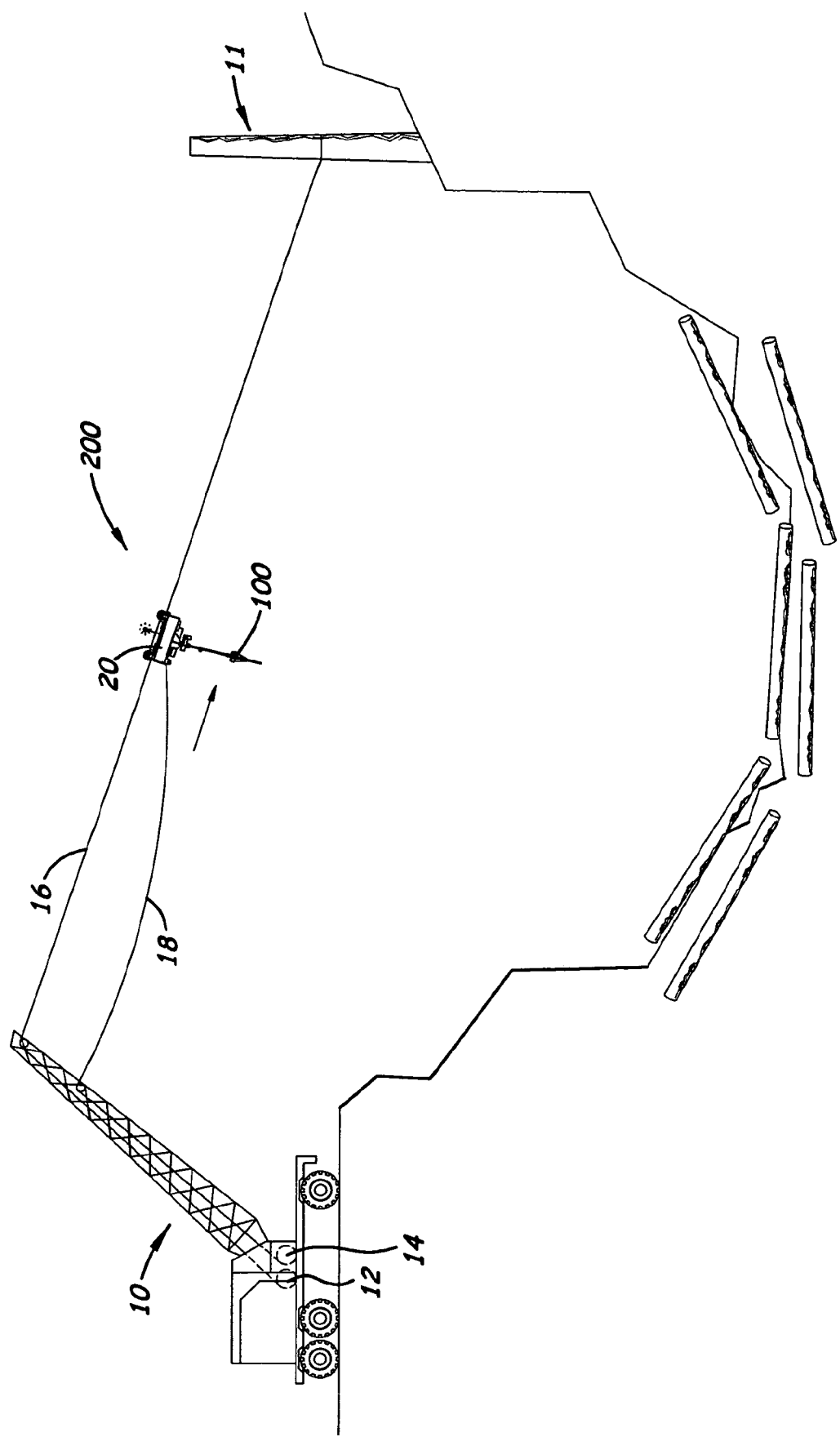
FIG. 1 is a schematic view of one embodiment of the invented logging system as the carriage is traveling toward the logging zone.

The preferred logging system features a remotely-controlled hydraulic system and a two-drum yarder that minimizes the expense, weight, and complexity of manufacture and that minimizes the complexity of operation. The preferred remote control device comprises a two function radio which signals a double-solenoid valve to control hydraulic fluid pressure supply to two hydraulic rams, one of which applies a skyline brake and one of which applies a towline brake. When a towline-braking signal is received, the valve releases the skyline brake and applies the towline brake; when a skyline-braking signal is received, the valve applies the skyline brake and releases the towline brake. The towline-braking signal preferably energizes a sequence relay, so that when the first radio transmitter button is pressed once, the grapple also rotates; if the first radio transmitter button is pressed a second time, the grapple rotates in a reverse direction; and, when the first radio transmitter button is pressed a third time, the grapple again reverses rotation.

In the preferred embodiment, the skyline is preferably anchored at one end to a stump, spar, or other securing device and at the other end it is connected to a device having a winch such as a yarder. Preferably, the towline is also connected to the yarder at one end and at the towline's other end the towline is connected to the grapple. The first radio signal is transmitted to the carriage causing the valve to release the skyline brake and apply the towline brake, which allows the carriage to roll down hill on the skyline, pulling the towline behind it. Preferably concurrently, the skyline is slackened by an operator of the yarder, so that the grapple carriage is lowered, both by rolling down the skyline and by the lowering of the skyline, toward a position above a log to be grabbed and lifted. If the yarder operator or a spotter believes the grapple needs to be turned to effectively grab the log, the first button is pressed a second time and held to rotate the grapple; if the operator wants to turn the grapple in an opposite direction, the first button is pushed a third time. Once the grapple is positioned around the log (the grapple is held open via a spring), the second radio button is pushed to signal the carriage, causing the double solenoid valve to apply the skyline brake and release the towline brake. The operator then uses the towline winch to tighten the towline, causing the grapple to close around and grip the log. The yarder operator then presses the first button again to apply the towline brake and release the skyline brake, which secures the grapple in the closed position via the towline brake clamping the towline in position relative to the carriage. The operator then winches in the towline to bring the carriage back to the landing. At the same time, the skyline is raised by the skyline wince to facilitate moving the grapple carriage with the log toward the landing.

Referring to the figures, there is shown one, but not the only, embodiment of the invented logging system 200. In the preferred embodiment, the logging system 200 includes a device having a first winch 12 and a second winch 14, a skyline cable 16 attached to the first winch 12 at a first end, a towline cable 18 attached to the second winch 14 at a first end, a carriage 20 riding on the skyline cable, a grapple 100 suspended from the carriage 20, and a second end of the towline cable 18 that extends through a portion of the carriage and attaches to the grapple 100 (see FIGS. 1-4). In the preferred embodiment, a remote control device operates one or more hydraulic brakes 34, 52 on the carriage 20 in order to control the movement of the carriage 20 relative to the skyline 16 and to control the movement of the towline 18 relative to the carriage, and, in doing so, to also control the grapple.

Figure 2:
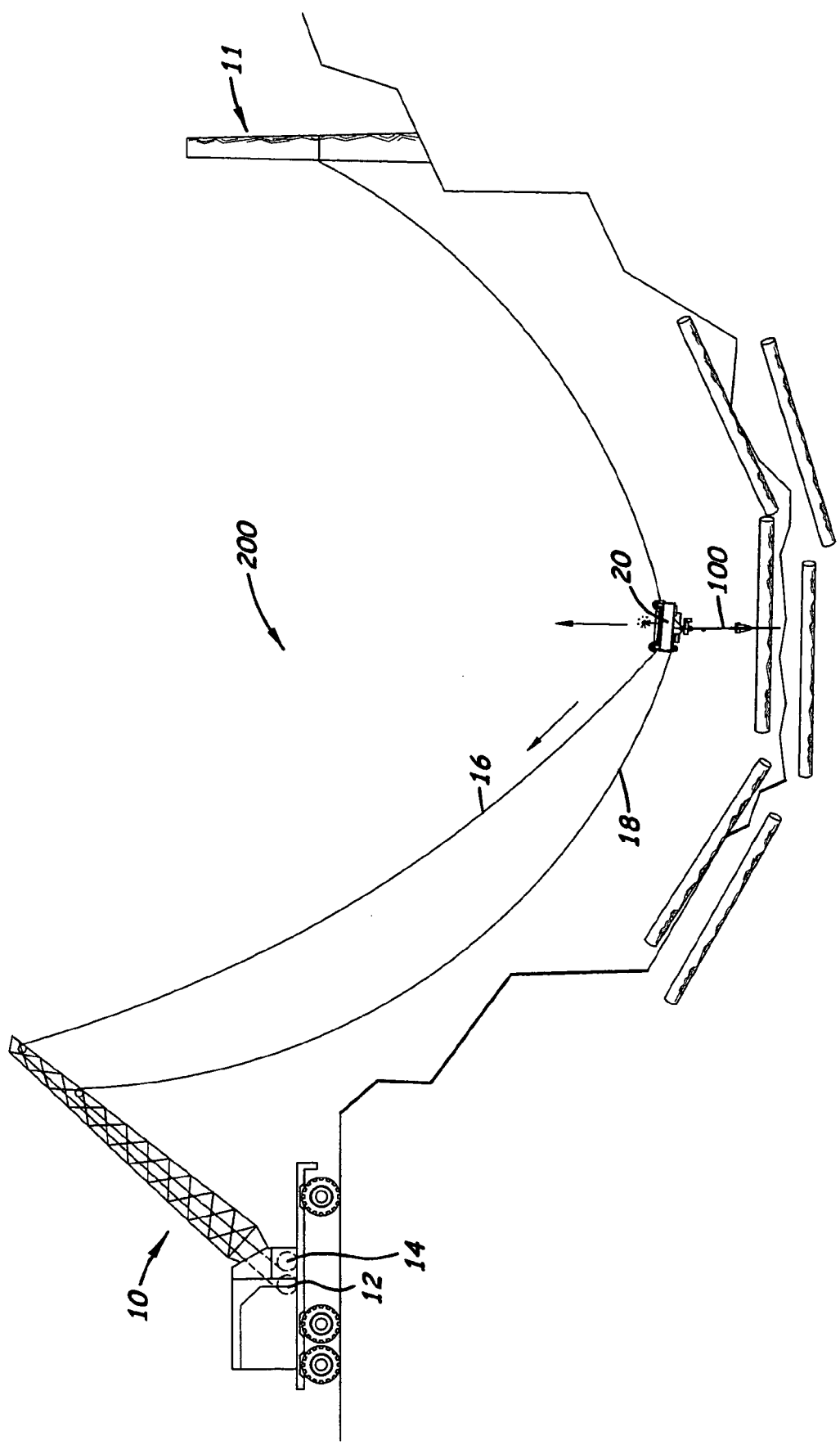
FIG. 2 is a schematic view of the embodiment shown in FIG. 1, after the grapple has grabbed a log.
Figure 3:
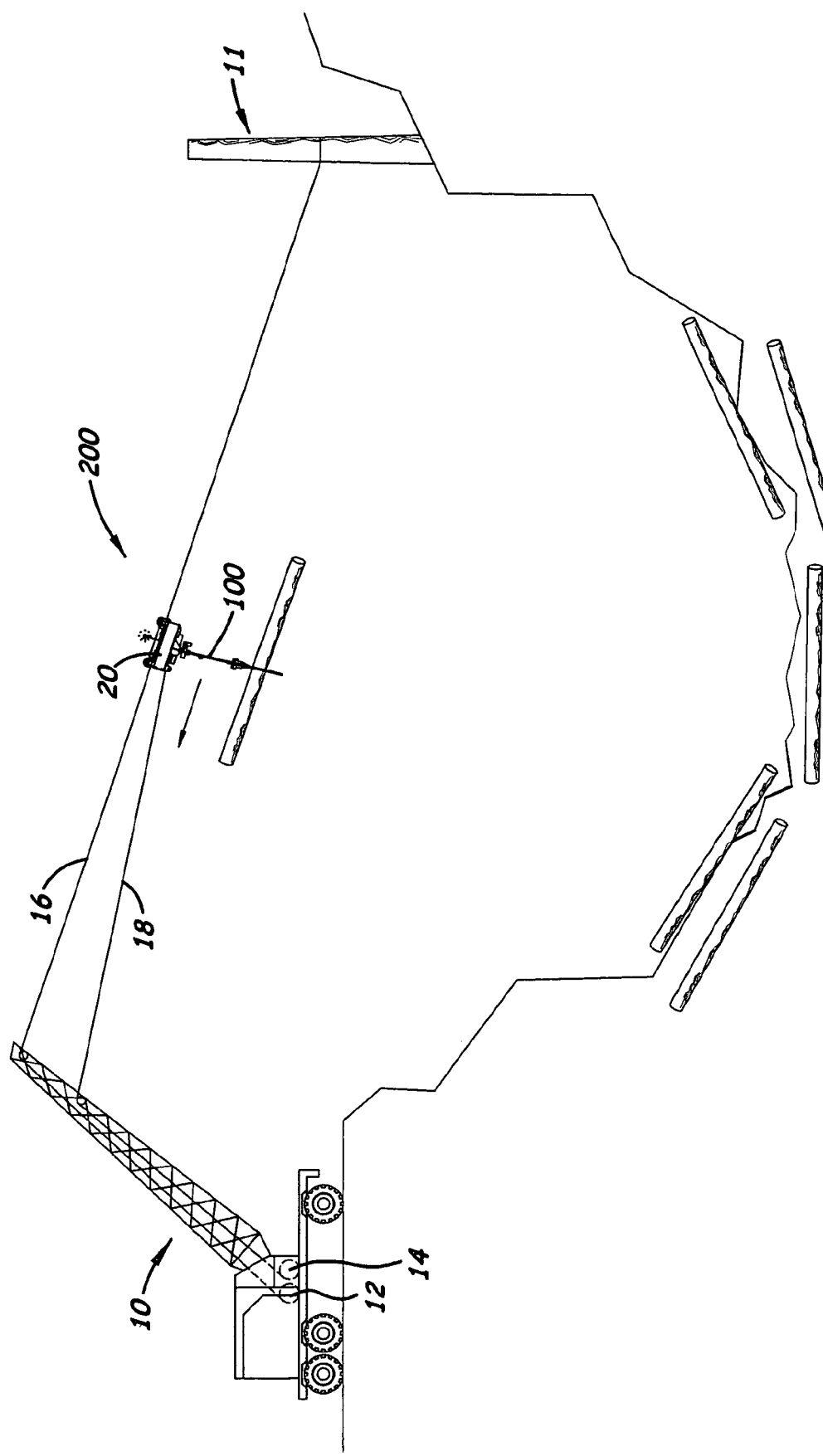
FIG. 3 is a schematic view of the embodiment shown in FIG. 1-2, as the log is being moved back toward the landing zone.
Figure 4:
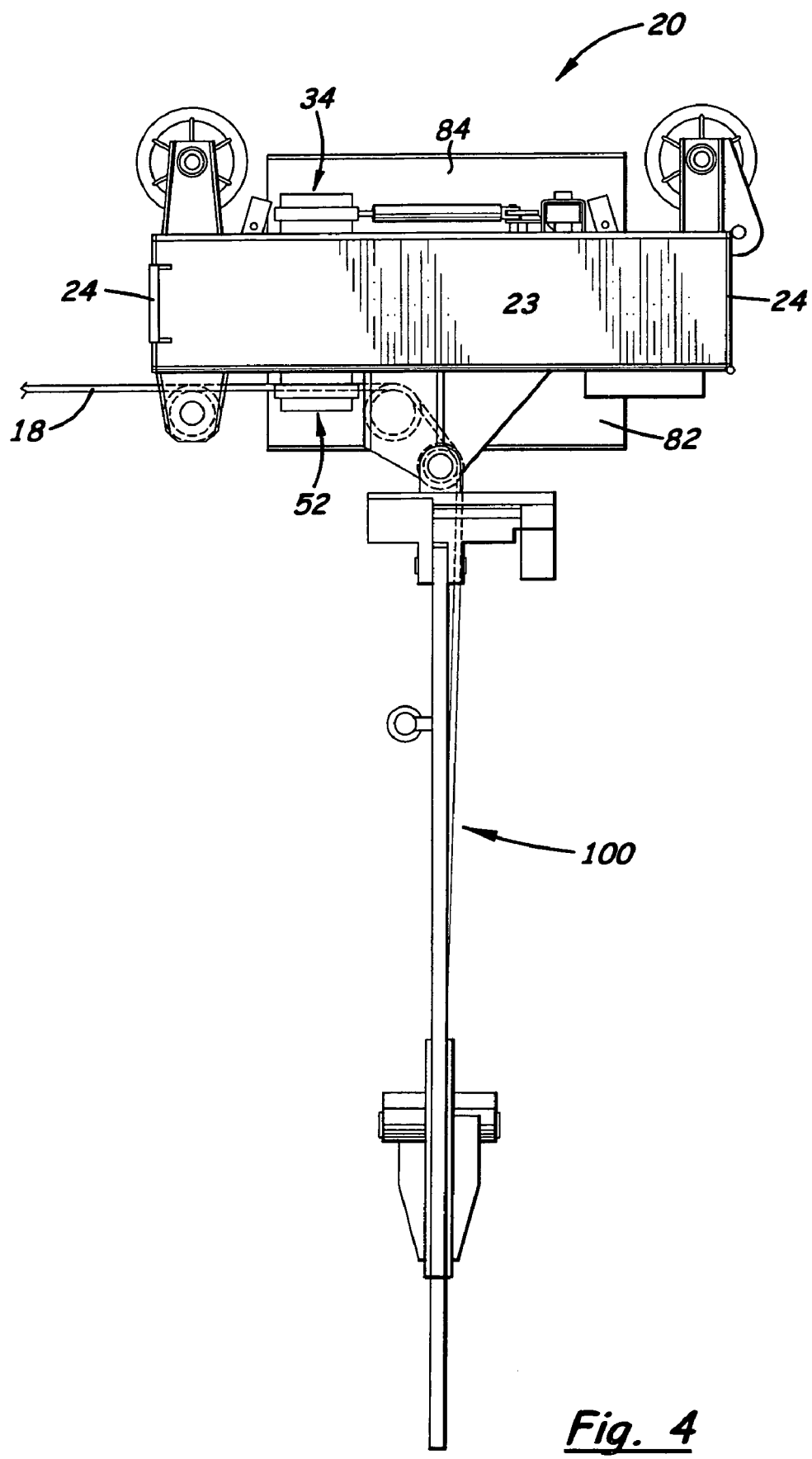
FIG. 4 is a side view of one embodiment of the carriage and grapple shown in FIGS. 1-3.

As shown in FIGS. 1-3, the skyline 16 is preferably a live skyline, so that the skyline tension may be altered. The skyline 16 is connected to an apparatus allowing it to be slackened or tightened, for example, the distal end of the skyline 16 may be anchored to a stump, spar or other securing device 11 and the other end may be connected to the device having a winch, such as a yarder 10. The carriage 20 is also adapted to move longitudinally along the skyline, rolling away from the yarder 10 by gravity as the skyline is being lowered to pick up a log, and being pulled toward the yarder 10 via a towline 18 as the skyline is being tightened to raise the carriage. Therefore, the combination of slackening or tightening the skyline, and carriage movement along the skyline, allows the system to lower the carriage 20 and grapple 100 to a position immediately and directly above a log to be grabbed (see FIG. 2) and also to elevate and retrieve the carriage 20 and grapple 100 back to the landing after the grapple 100 has grabbed the log (see FIG. 3).

Preferably, the carriage 20 includes a housing that is rectangular in configuration, having a top wall 21, a bottom wall 22, two side walls 23, and two end walls 24; other housing configurations may be used. The walls may be secured by bolts, welding, integral forming, or other means; alternatively, the end walls 24 or side walls 23 may be hinged on one end in order to gain access to the interior of the housing and secured via fasteners when closed.

Figure 5:
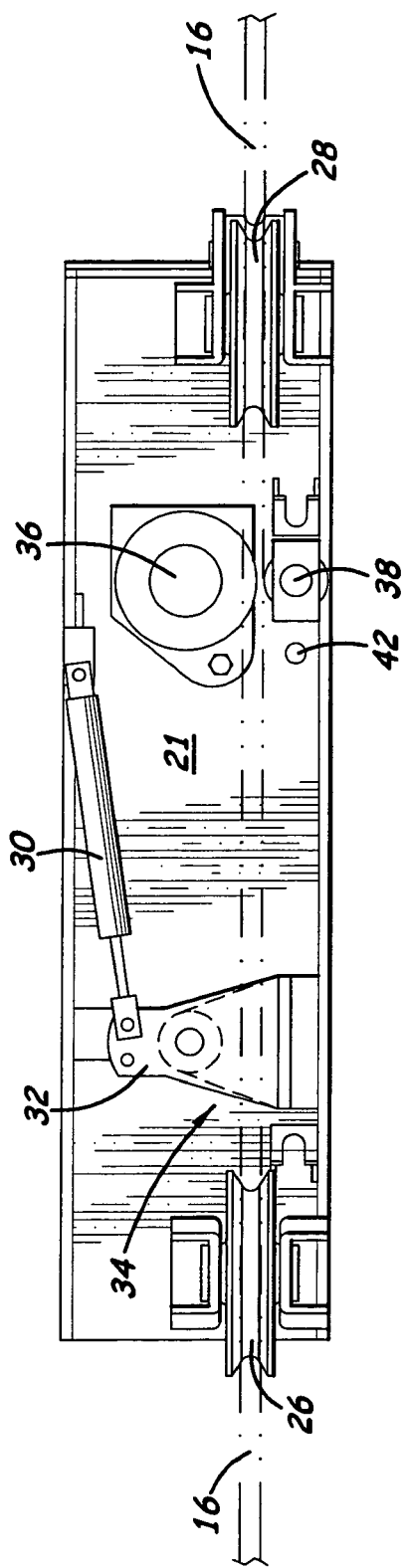
FIG. 5 is a top view of one embodiment of the carriage shown in FIGS. 1-4.

As shown in FIG. 5, the outer surface of the top wall 21 of the housing includes two spaced apart vertically oriented sheaves 26, 28 that rollably engage the upper surface of the skyline cable 16. Each sheave 26, 28 rotates on an axle that is supported by brackets. The outer surface of the top wall also supports a brake 34 comprising a hydraulic ram 30 and cam 32 and a horizontally-oriented grooved drive wheel 36 spaced apart from an idler roller 38 for driving a hydraulic pump 40. Located near the idler roller 38 is a radio antennae 42, which connects to a radio receiver 46 inside the housing. The skyline cable 16 passes from the first vertical sheave 26 through the brake 34, between the horizontal drive wheel 36 and idle roller 38 and under the second vertical sheave 28. In order to apply the skyline brake 34, the hydraulic ram 30 lengthens, causing the cam 32 to engage the skyline cable 16 and prevent movement of the carriage 20 relative to the skyline cable 16.

The skyline cable 16 passes between the drive wheel 36 and the idler roller 38, and the kinetic energy from the movement of the carriage 20 along the skyline cable 16 is transferred to the hydraulic pump 40 inside the carriage 20, via the drive wheel 36. The pump 40 may be a variable displacement pump or a gear pump, or other designs as would be understood by one of skill in the art. The drive wheel 36, idler roller 38, and the pump 40 are all multi-directional, so that the pump is powered whether the carriage is rolling down the skyline or being pulled up the skyline. After the skyline cable 16 passes between the drive wheel 36 and the idler roller 38, it passes under the second vertical sheave 28.

Figure 6:
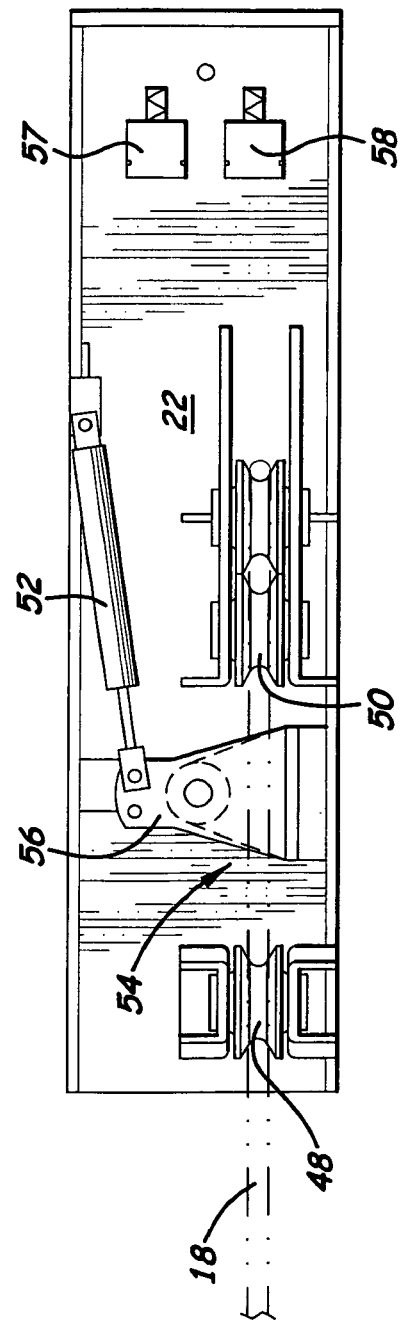
FIG. 6 is a bottom view of one embodiment of the carriage shown in FIGS. 1-5.

As shown in FIG. 6, the bottom surface of the bottom wall 22 of the housing holds two spaced apart vertically oriented grooved wheels 48, 50. In the preferred embodiment, a first wheel 48 is located nearer the end of the bottom wall of the housing and is smaller in diameter than a second wheel 50. Preferably, the first wheel 48 rotates on an axle that is supported by brackets. The second wheel 50 is preferably nearer the middle of the bottom wall 22 of the housing. Between the first 48 and second 50 wheels is a brake 54 comprising a hydraulic ram 52 and cam 56, similar to the skyline brake on the top wall 21. The towline cable 18 passes from the first wheel 48, through the brake 54, over the second wheel 50 and to the grapple 100. In order to apply the towline brake 54, the hydraulic ram 52 lengthens, causing the cam 56 to engage the towline cable 18 and prevent movement of the towline cable 18 relative to the carriage 20. Also, on the bottom wall 22 of the housing are two three-way solenoid valves 57, 58 for directing hydraulic fluid to a hydraulic motor 74 on the grapple 100. Preferably, the two three-way solenoid valves 57, 58 are contained within their own protective housing, and the outside of the carriage 20 also may be fitted with coverings 84 and 86 for protecting the brakes 34, 54 from debris. While brakes each having a hydraulic ram operating a cam (that grips or clamps its respective line) are preferred, alternative brakes, rams, and/or gripping or clamping members may be used to brake the carriage relative to the skyline and/or to brake the towline relative to the carriage.

Figure 7:
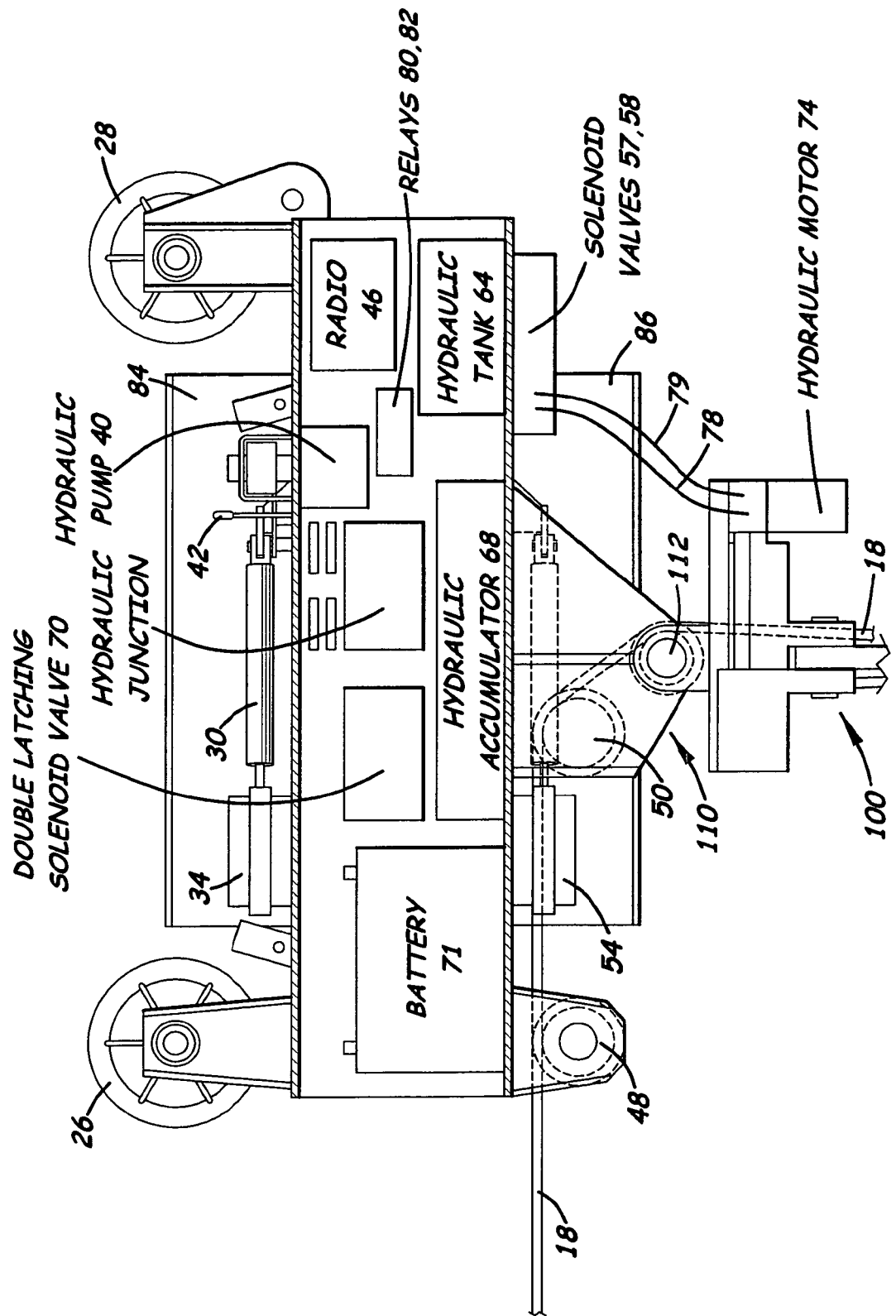
FIG. 7 is a schematic side view of one embodiment of the carriage shown in FIGS. 1-6 with the access cover removed (wherein electrical and hydraulic lines inside the carriage are not shown).

Within the carriage housing, there is a hydraulic pump 40, two sets of check valves 60, 62 for the pump 40, a hydraulic tank or reservoir 64, a hydraulic manifold 66, a hydraulic accumulator 68, a radio receiver 46, a radio controlled double-solenoid valve 70 to control the skyline 34 and towline 54 brakes, relays 80, 81, 82, and a battery 71 (to power radio receiver 46, relays 80, 81, 82, solenoid valves 70, 57, 58, and a control valve 72 for a hydraulic motor 74) (see FIG. 7). The battery 71 is preferably a twelve volt, deep cycle battery that is charged once a week. The two, three-way solenoid valves 57, 58 are preferably provided on the outer surface of the bottom wall 22 of the housing so that these valves are in close proximity to the hydraulic motor 74 located on an upper portion of the grapple 100. The inventor notes that the arrangement of the preferred equipment and its location either inside the housing or outside the housing may be adjusted based on personal preferences and to minimize the hydraulic and electrical line lengths.

Figure 9:
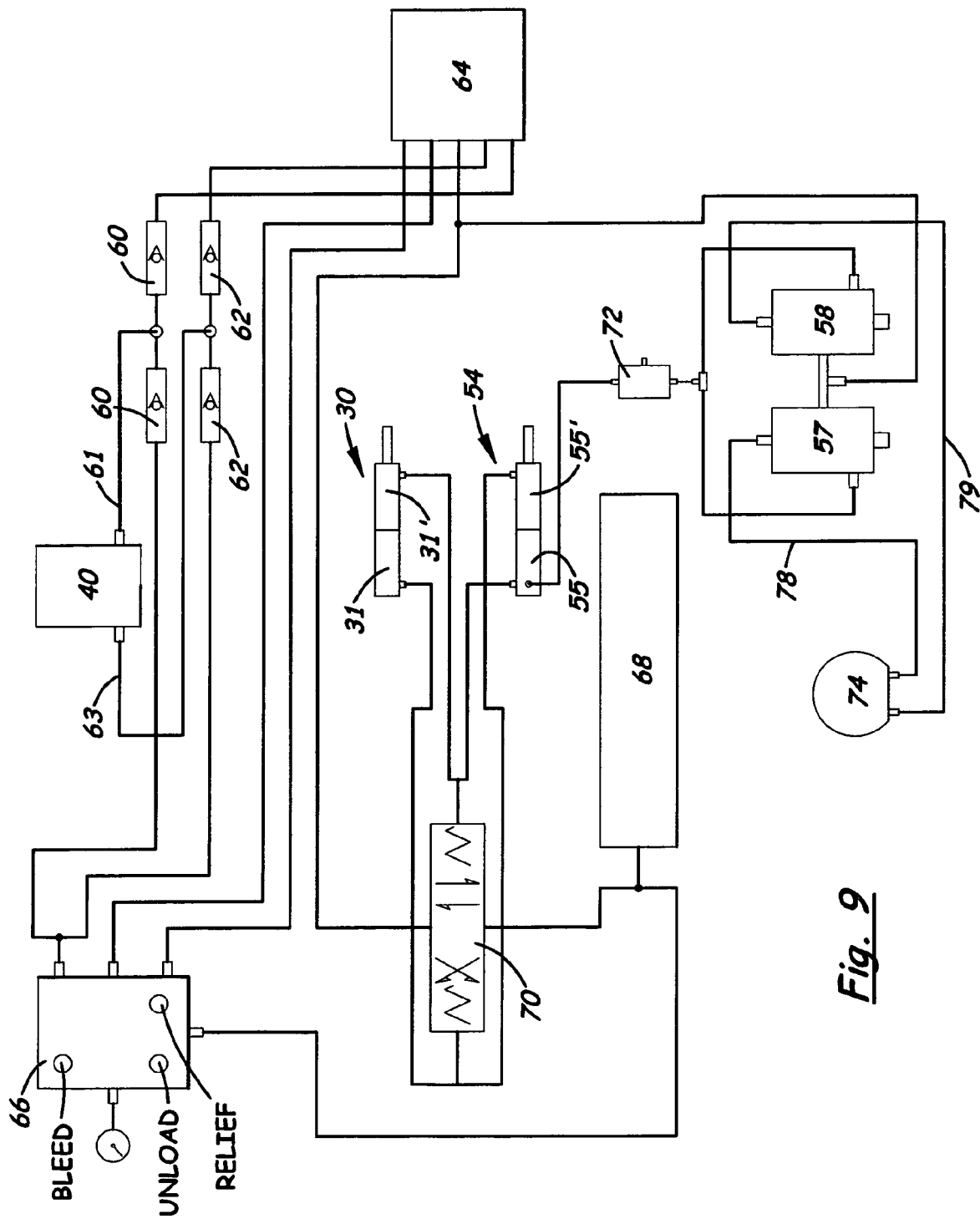
FIG. 9 is a schematic flow diagram of a preferred embodiment of the hydraulic system showing hydraulic components and hydraulic interconnections.
Figure 10:
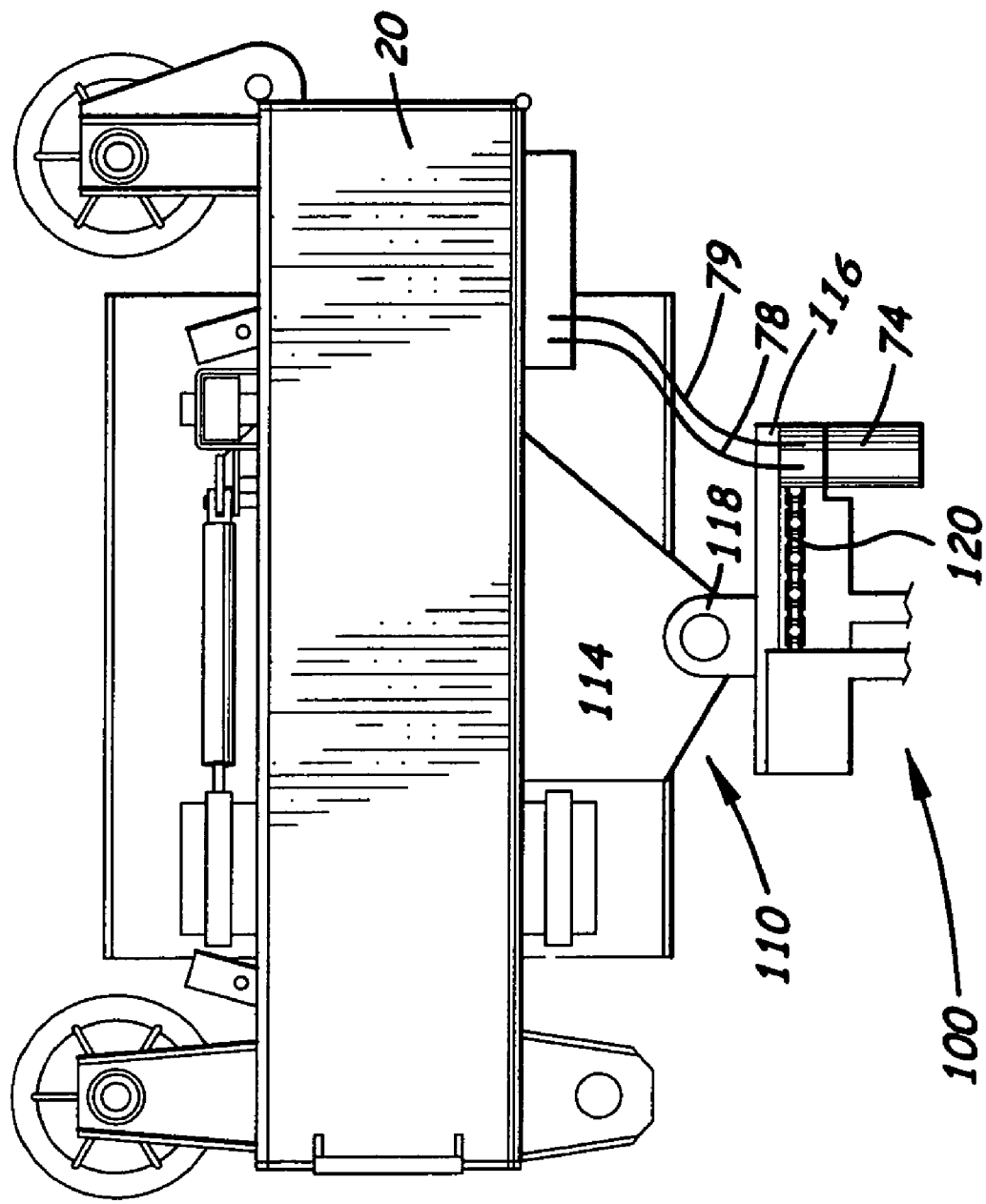
FIG. 10 is a schematic side view of one embodiment of the carriage shown in FIGS. 1-6 with the access cover intact.
Figure 11:
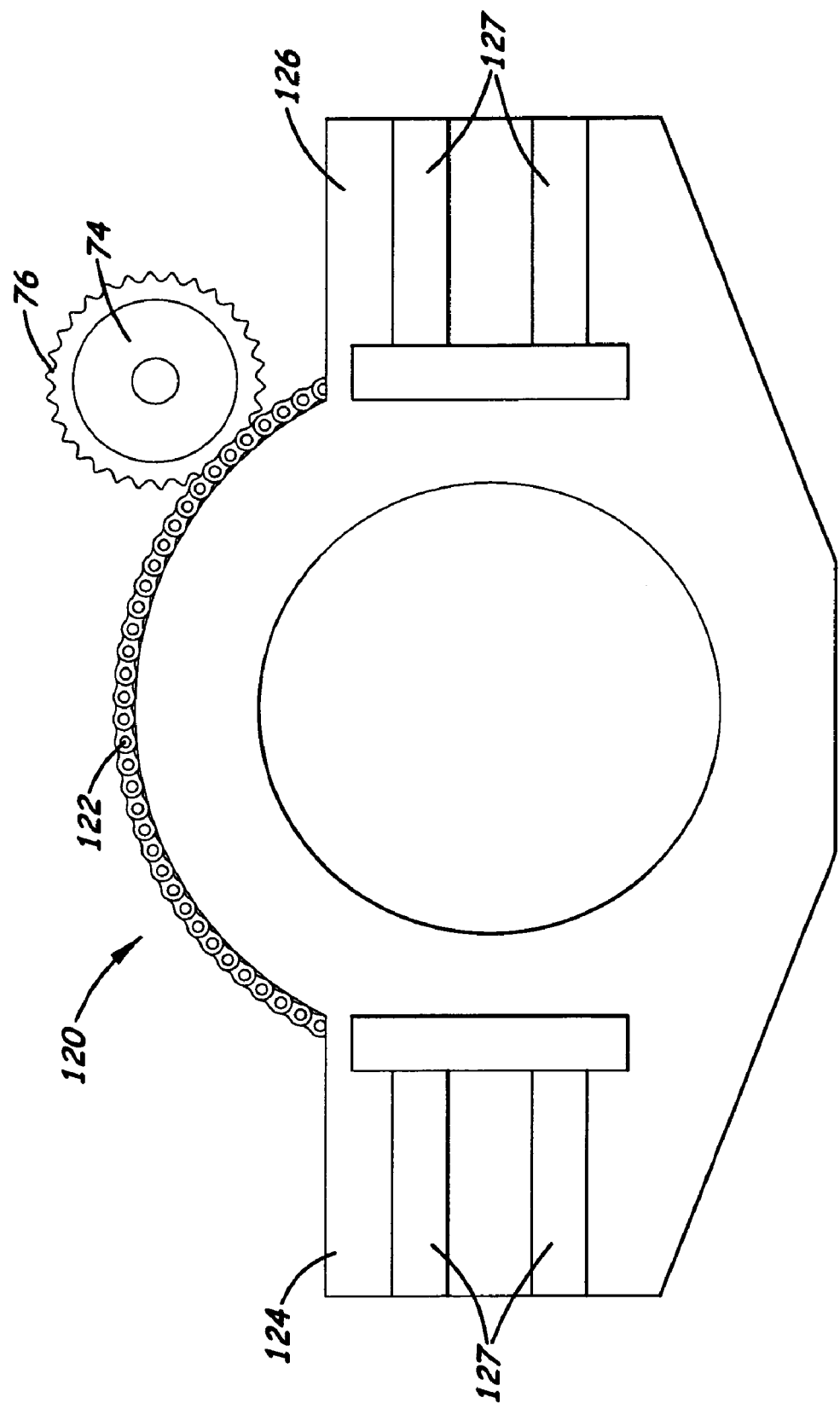
FIG. 11 is a schematic top view of one embodiment of a system for swiveling the grapple, which view features a rotational plate with chain and a hydraulic motor on the grapple located on the grapple assembly.
Figure 12:
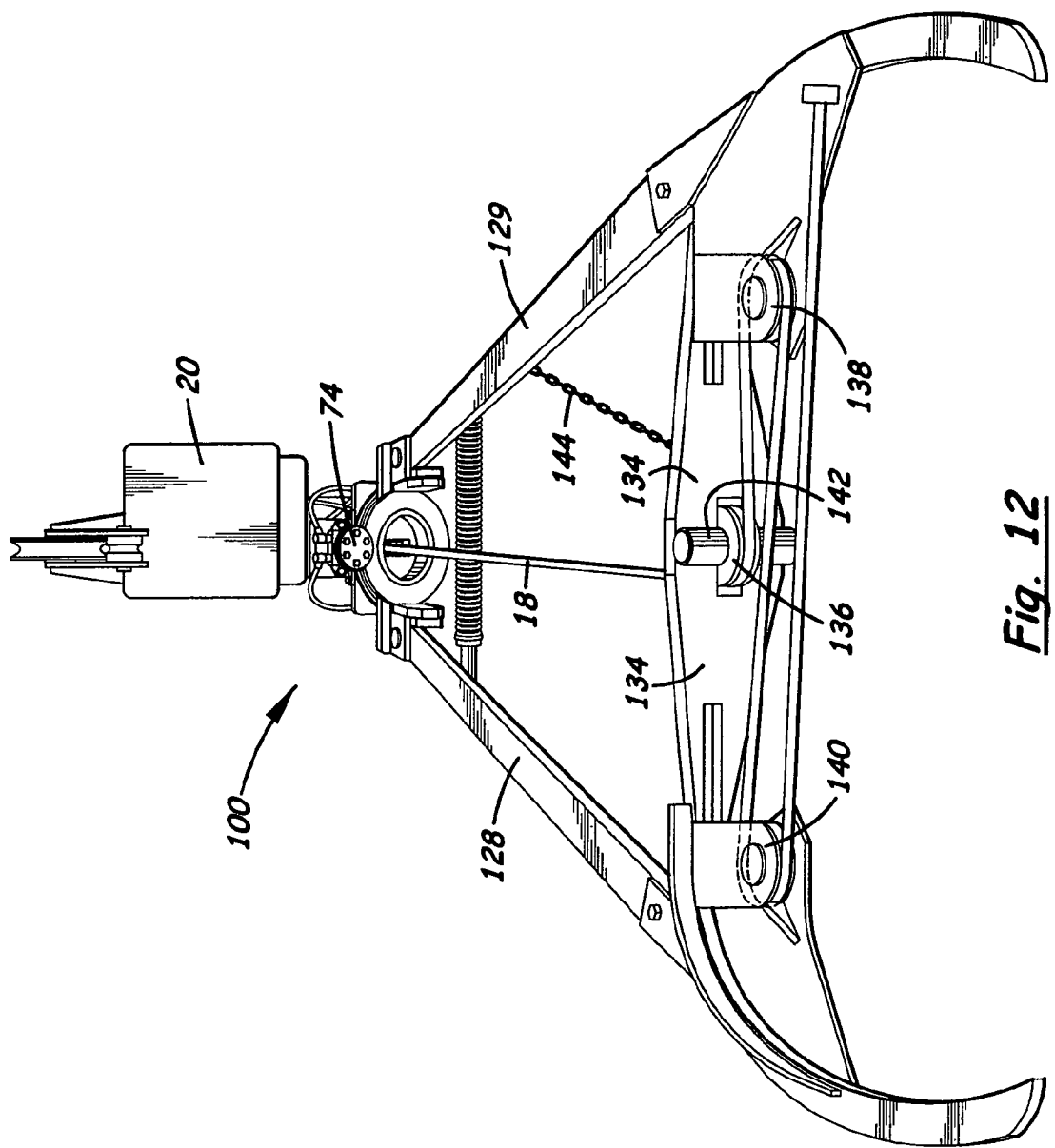
FIG. 12 is a perspective view of the embodiment of the grapple and carriage shown in FIGS. 1-7 and 10.

The rotational motion generated by the skyline 16 turning the horizontal drive wheel 36 on the top wall 21 of the housing is transferred to the hydraulic pump 40. Referring to FIG. 9, the hydraulic pump 40 pressurizes the liquid in the hydraulic system, and particularly pressures the accumulator 68. The hydraulic pump 40 is a bi-directional pump, so that the pump is driven and charges the accumulator 68 when the drive wheel 36 is rotating both clockwise or counterclockwise (see FIG. 5), ie., when the carriage 20 is rolling down the skyline 16 or being pulled back toward the landing. To accommodate the bi-directional feature of the pump 40, two lines 61, 63 and two sets of check valves 60, 62 are provided from the hydraulic tank 64 to the hydraulic manifold 66. The hydraulic manifold 66 connects to the accumulator 68 to maintain accumulator 68 pressure and also to allow liquid to spill back to the hydraulic tank 64 when the accumulator 68 is at the pressure set point. As discussed further below, the pressurized hydraulic system applies and releases skyline and towline brakes 34, 54, which, in cooperation with the payout and reel-in of the skyline and towline by a two-drum yarder, control the carriage movement and grapple operation. As also discussed further below, the pressurized hydraulic system also provides for swiveling of the grapple to better target the log(s).

Referring to FIGS. 1-3 and FIGS. 8 and 9, the preferred control system may be operated as follows. The operator in the yarder 10 has a remote control radio transmitter unit which is used to send radio signals that actuate the preferred steps:

1. Apply the towline brake 52 and release the skyline brake 34 to allow the carriage 20 to roll down the skyline 16. (In the preferred embodiment, the grapple may also rotate during at least part of this step).
2. Rotate the grapple 100 (reversing the direction of rotation compared to step 1, above) to change the position of the grapple 100 over a particular target log or object.
3. Rotate the grapple 100 (reversing the direction of rotation compared to step 2, above), if necessary to optimize the position of the grapple 100 over the target.
4. Apply the skyline brake 34 and release the towline brake 52, so that the towline 18 may be tightened to close the grapple 100.

5. Apply the towline brake 52 to secure the grapple 100 in the closed position and release the skyline brake 34 to allow the carriage 20 to be pulled back toward the landing by the towline.

Figure 8:
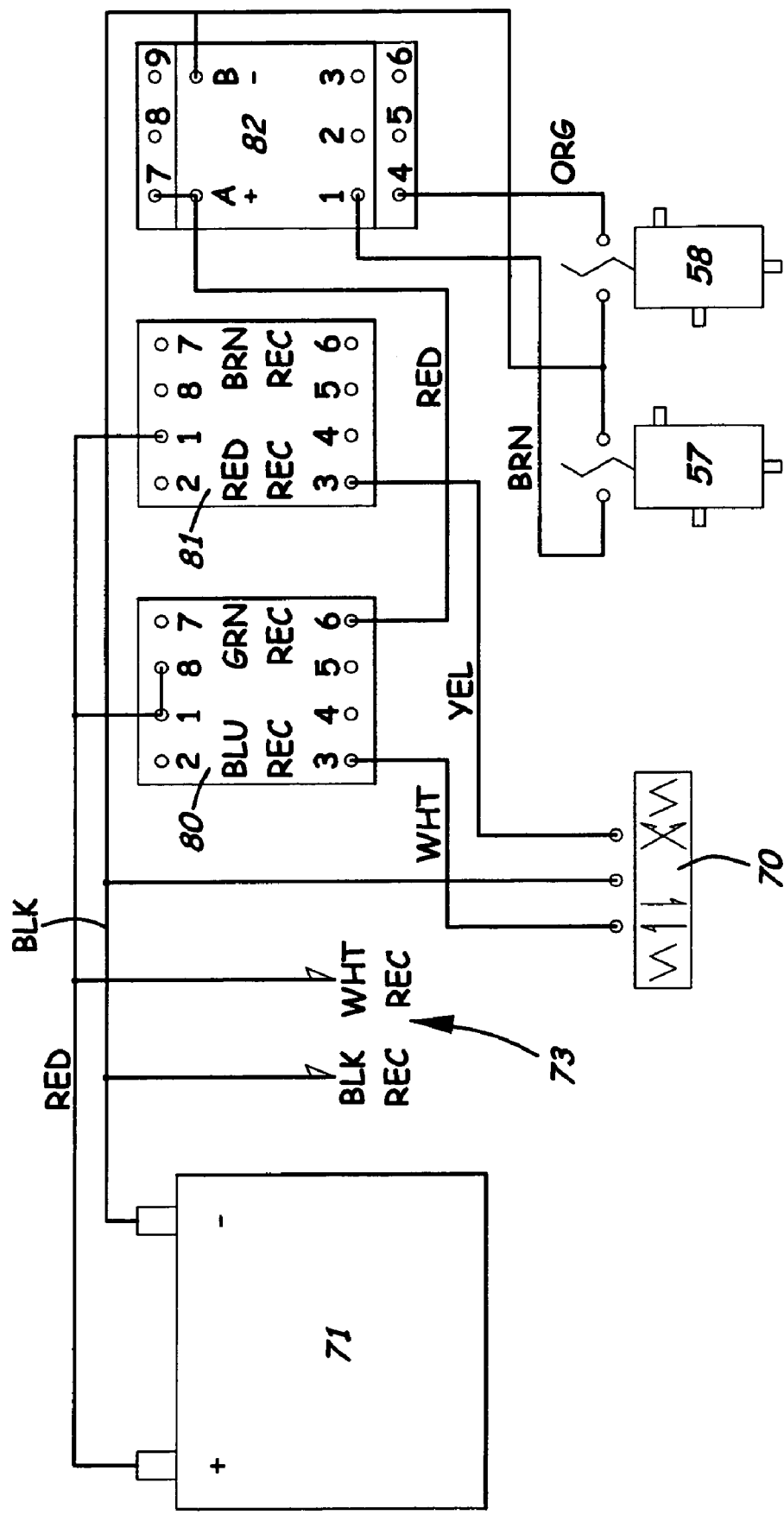
FIG. 8 is a schematic electrical diagram of preferred components for cooperation with the preferred radio transmitter to actuate solenoid valves for the skyline and towline brake systems and solenoid valves for the grapple rotation motor.

A benefit of the preferred control system is the simplicity of the apparatus and steps that the operator uses to control the logging system 200. The preferred remote control radio system is a two-button Talkie Tooter® Radio Controlled Carriage System, available from Rothenbuhler Engineering of 524 Rhodes Road, Sedro Woolie, Wash., 98284, combined with an electronics system such as illustrated in FIG. 8 that provide the latching and sequencing capabilities to perform the preferred Steps 1-5 above. However, other radio control systems, including other radio transmitters, receivers, and associated electronics systems, may be used, as will be known to those skilled in the art after reading this Description and viewing the Drawings. For example, the system portrayed in FIG. 8, or others, may alternatively be configured as solid state circuitry, in one or more microprocessors such as programmable chip(s) or board(s) that performs the desired functions. Thus, the term "electronics unit" is not meant to limit the electronics system to the preferred embodiment shown in FIG. 8. Also, embodiments of an "electronics unit" may be in one or more housings, or no housing, inside or outside the carriage.

The preferred radio transmitter unit is positioned in the operator's cab and preferably has only two control buttons. A first button is used to perform Step 1 above when pressed a first time. The same first button is used to perform Step 2 above when pressed a second time, and to perform Step 3 above when pressed a third time. A second button is used to perform Step 4 above when pressed a first time. After Step 4, the first button is pressed again to perform Step 5. These steps may be enabled by relays 80 and 81, and sequence relay 82, as illustrated in FIG. 8.

Referring to FIG. 8, a battery powers double poll, double throw relay 80; relay 81; radio receiver 46 in the carriage via connections 73; sequence relay 82 via relay 80; double solenoid valve 70 via relays 80 and 81; and solenoid valves 57 and 58 via relay 82. The battery positive terminal is connected to terminals 1 and 8 of relay 80 and to terminal 1 of relay 81. The radio receiver is connected to terminals 2 and 7 of relay 80, and to terminals 2 and 7 of relay 81. Terminals 3 and 6 of relay 80 are normally open and terminals 4 and 5 of relay 80 are normally closed.

In Step 1, a relay 80 switch comprising terminal 3 is closed (via receiver 46 upon pressing of the first transmitter button), which energizes the double-solenoid valve 70 to open the skyline brake 34 and close the towline brake 54. The preferred solenoid valve 70 is a Vickers valve part no. DG4V32NMUG760 valve with an "indent" spool for latching the valve. This way, even though the operator releases the first transmitter button after the first pressing, valve 70 will stay latched in the desired position applying the towline brake 54. A relay 80 switch comprising terminal 6 is also closed upon the first pressing of the first transmitter button, which energizes sequence relay 82, to direct current via the switch comprising terminal 1 to three-way solenoid valve 57 for rotating grapple 100 in a first direction. However, because the first pressing of the first transmitter button typically has a duration of only a second or two (the double-solenoid valve latches and the user removes his finger from the first button), the grapple will not rotate very far in this step. The next time that sequence relay 82 is energized (Step 2) by pressing (and holding) the first transmitter button (via receiver 46 and terminals 2 and 7 of relay 80), the sequence relay 82 opens the switch comprising terminal 1, and closes its switch comprising terminal 4. Thus, sequence relay terminal 4 provides current to the other three-way solenoid valve 58, which directs hydraulic fluid to hydraulic motor 74 in an opposite direction to rotate grapple 100 in a reverse direction. If the operator is still not satisfied with the position of the grapple over the log(s) at this point, he pushes and holds the first transmitter button again, as in Step 3, opening the switch comprising terminal 4 and again closing the sequence relay switch comprising terminal 1, which energizes three-way solenoid valve 57 again to reverse flow to through hydraulic motor 74 to again reverse the rotation of the grapple 100.

In Step 4, the second transmitter button is pushed, which (via radio receiver 46 and relay 81 terminal 2) causes relay 81 to close its switch comprising terminal 3, which actuates the double-solenoid valve 70 to apply the skyline brake 34 and release the previously-latched towline brake 54. Again, the preferred solenoid valve 70 with a "indent" spool latches and stays in this new position until the first button is pressed again.

The following description further details that carriage hydraulics schematically portrayed in FIG. 9. In Step 1, relay 80 actuates the double-solenoid valve 70 into a position which supplies hydraulic pressure to the lengthening chamber 55 of the towline ram 52 to apply the towline brake 54. In doing so, the double-solenoid valve 70 also supplies hydraulic pressure to the shortening chamber 31' of the skyline ram 30 to release the skyline brake 34. As noted above, the double-solenoid valve 70 is a latching solenoid valve, so that, once the first button is pressed, it remains latched until the second button is pressed and vice versa. As may be seen in FIG. 9, the preferred hydraulic system including the double-solenoid valve ensures that only one of either the skyline brake 34 or towline brake 54 is applied at one time; applying one of the two brakes automatically releases the other brake.

In Step 2, sequence relay 82 actuates the hydraulic motor 74 via control valve 72 and one of the-two, three-way solenoid valves (57). In Step 3, the sequence relay 82 actuates the other of the two, three-way solenoid valves (58) to operate the hydraulic motor 74 in the opposite direction. A benefit of this preferred system is that hydraulic pressure is supplied to the control valve 72 and the three-way solenoid valves 57, 58 from the lengthening chamber 55 of the towline ram 52. This simplifies the hydraulic and electronics, and is effective in view of the fact that swiveling/rotating of the grapple is only needed when the towline is clamped to the carriage when the carriage is rolling down the skyline or directly above the log.

The control valve 72 regulates hydraulic fluid flow to the three-way valves 57, 58, to reduce the speed of the hydraulic motor 74 below the speed at which it would operate if the full flow, produced by approximately 1000-1500 psi of hydraulic pressure at the rams, were supplied to the motor. The control valve 72 is preferably adjusted, in the shop or on the landing, prior to use of the carriage 20 to a setting that produces an acceptable motor speed. A single adjustment prior to operation is typically sufficient, and this control valve 72 is typically not adjusted during operation of the carriage 20 on the skyline.

In Step 4, relay 80 actuates the double-solenoid valve 70 into a position that supplies hydraulic pressure to the lengthening chamber 31 of the skyline ram 30 to apply the skyline brake 34. In doing so, the double-solenoid valve 70 also supplies hydraulic pressure to the shortening chamber 55' of the towline ram 52 to release the towline brake 54 (so that the towline 18 may be tightened to close the grapple 100).

Upon pressing the first button again (Step 5), the relay 80 actuates the double-solenoid valve 70 back to the position wherein the towline ram 52 is lengthened, the skyline ram 30 is shortened, and consequently the towline brake 54 is applied and the skyline brake 34 is released (so that the towline 18 may be reeled-in to pull the carriage 20 back along the skyline 16 to the landing near the yarder 10).

Another benefit of the preferred logging system is that it utilizes a two-line system, and that it is operated by only two winches 12, 14 located on a single yarder 10 or other machine. This greatly reduces the expense and complexity of the equipment, and allows a single operator to control the logging system with the two transmitter buttons (for the radio-controlled carriage hydraulics) and a joystick (for the two winches) and typically without a spotter on the ground and without any other personal operating or assisting in operation of the yarder 10, carriage 20, grapple 100, and lines 16, 18. Referring again to Step 1, the operator signals to skyline winch 12 via the joystick to reel out the skyline cable 16. Thus, the skyline cable 16 is dropping while at the same time the carriage 20 is rolling down the skyline 16 due to gravity and is also pulling out the towline cable 18 from the towline winch 14 (see FIG. 1). After the towline brake is released in Step 4, the operator signals the towline winch 14, via the joystick, to reel in the towline cable 18 to an extent that closes the grapple 100 (see FIG. 2). After Step 5, the operator signals, via the joystick, the skyline winch 12 to reel in the skyline cable 16 to raise the skyline cable 16 and, generally at the same time, the towline winch 14 to reel in towline cable 18, thus lifting up the carriage 20, and pulling it rearward toward the landing at the same time (see FIG. 3).

As shown in FIGS. 7 and 10-15, the grapple 100 is preferably suspended from the bottom wall 22 of the carriage housing via a second housing 110 comprising two side walls 114, and base plate 116 having two connecting arms 118 that extend along the outside surface of the grapple housing 110 and that pivotally mount on axle 112. This pivotal mount on axle 112 allows the grapple assembly to swing relative to the carriage in a plane parallel to the skyline and towline.

Figure 13:
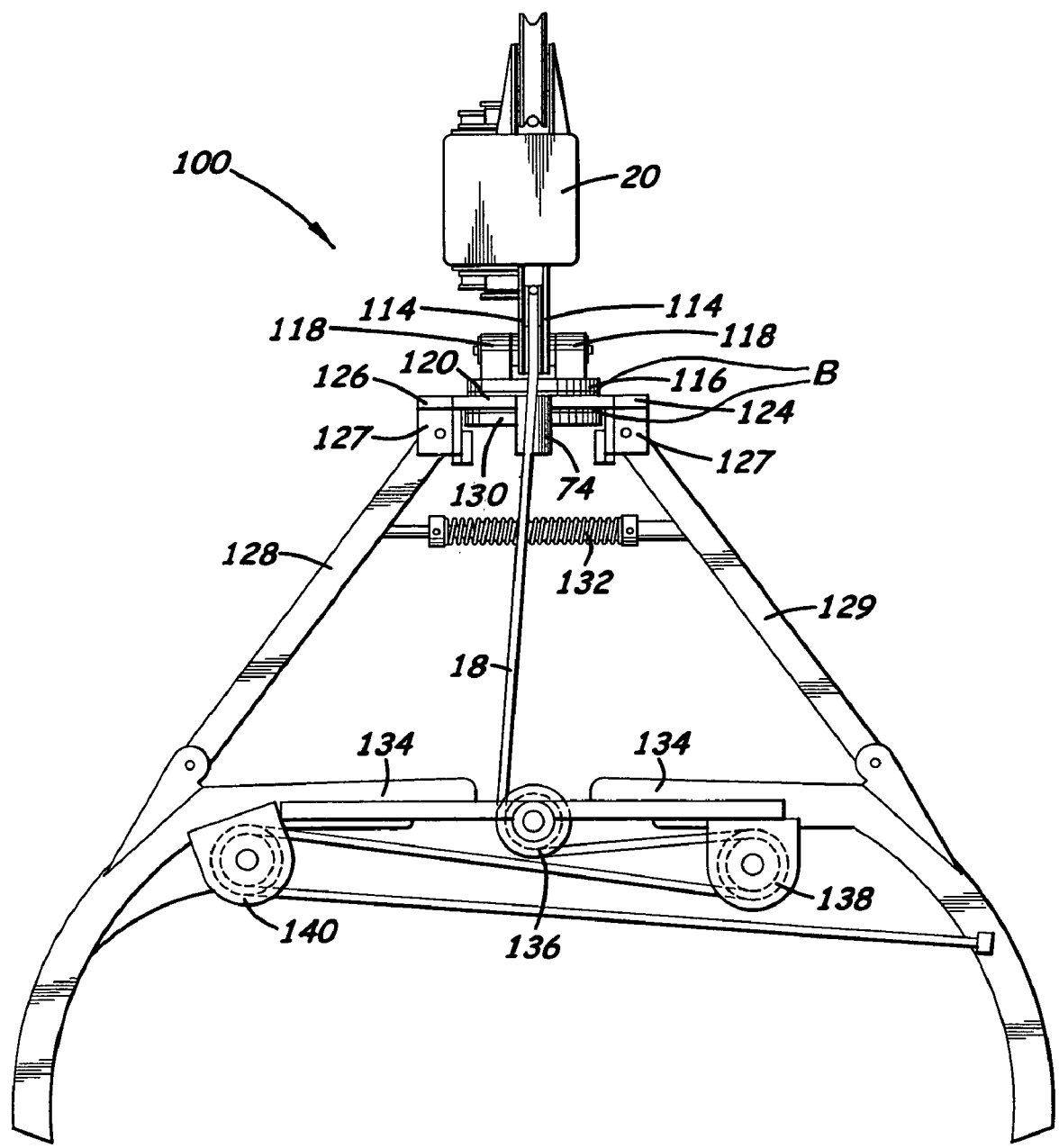
FIG. 13 is a rear view of the embodiment of the grapple and carriage shown in FIGS. 1-7 and 10-12 with the grapple in an open position.
Figure 14:
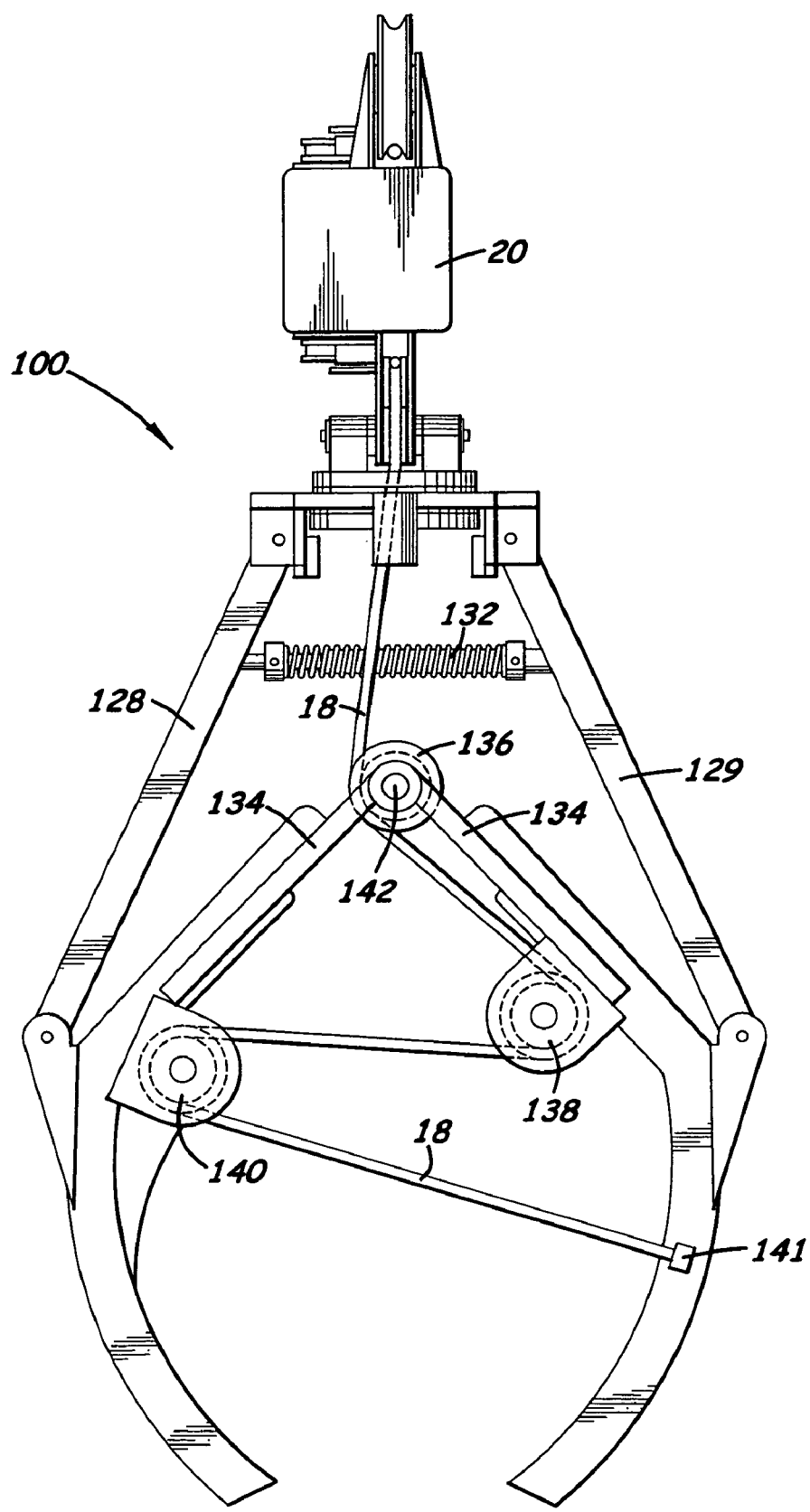
FIG. 14 is a rear view of the embodiment of the grapple and carriage shown in FIGS. 1-7 and 10-13 with the grapple in a closed position.
Figure 15:
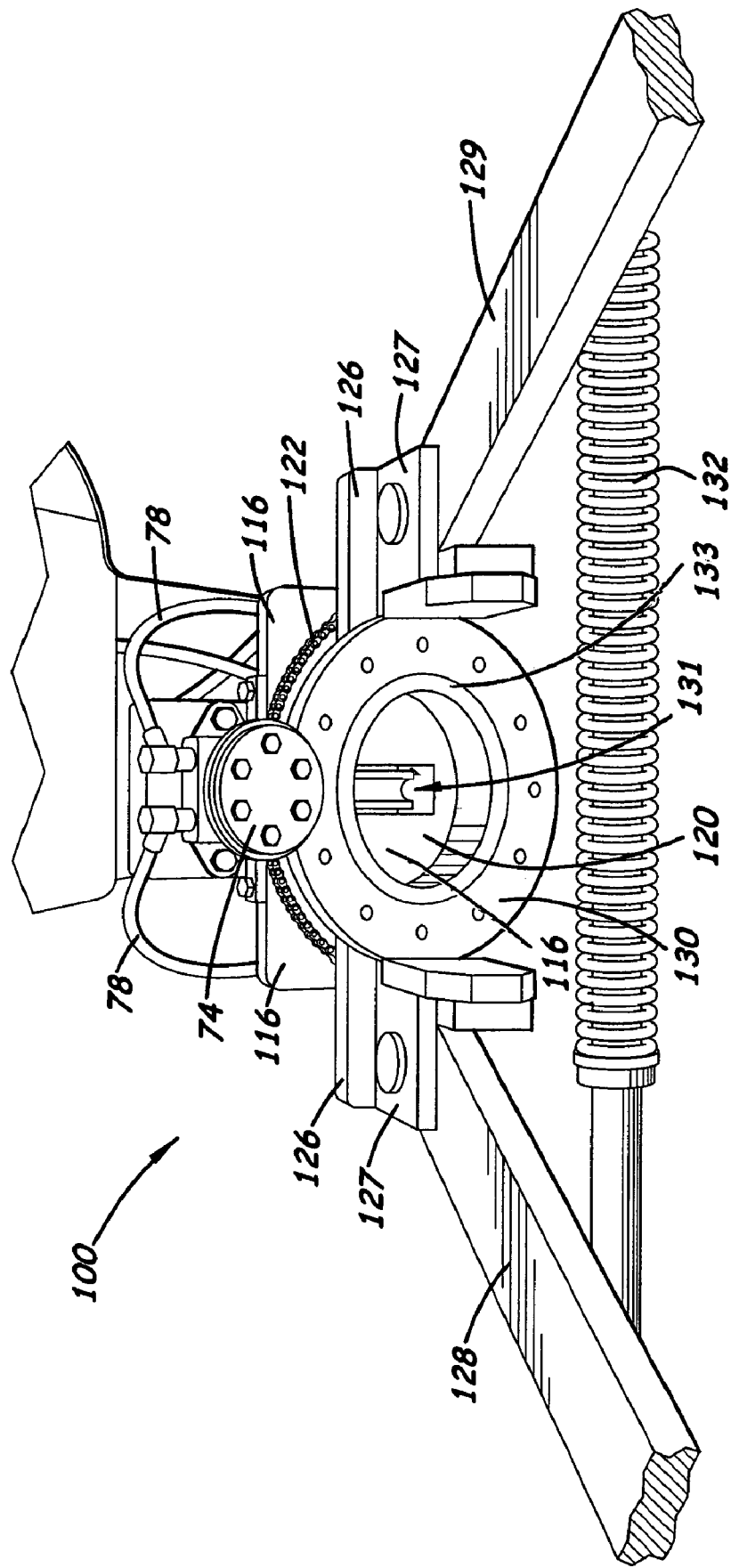
FIG. 15 is a partial perspective view of the embodiment of the grapple shown in FIGS. 1-7 and 10-14.

Directly below the base plate 116 is a rotational plate 120, which is rotatably mounted between base plate 116 and circular plate 130, in such a way that allows the rotational plate 120 to rotate relative to the base plate and the circular plate 130 in a plane generally parallel to the bottom wall 22 of the carriage. Circular plate 130 is connected to base plate 116, preferably by being fixed to a cylinder 133 that is fixed to and extends down from base plate 116 around aperture 131. Circular plate 130 may be fixed to cylinder 133 by various methods, for example, plate 130 having internal threads cooperating with external threads on cylinder 133. UHMW plates B or other bearing surfaces may be used, preferably on both sides of rotational plate 120 (FIG. 13). Grapple arms 128, 129 connect to rotational plate 120, via the downward extensions 127 of arms 124, 126, and, therefore, grapple arms 128, 129, arms 124, 126, and extensions 127 all rotate with the rotational plate 120 to swivel the grapple.

Swiveling of the grapple 100 is preferably powered by, and controlled by, a hydraulic motor 74. A semicircular chain 122 is fixed on the perimeter of rotational plate 120 and driven by a gear 76 of the hydraulic motor 74 (see FIGS. 11 and 15). Preferably, the chain 122 extends between 60 and 90 degrees, and preferably about 70 degrees, around the rotational plate 120, and the motor, therefore, may rotate the plate (and consequently the grapple arms) approximately that same amount, for example, preferably about 70 degrees, by rotating approximately 35 degrees in each direction. Typically, this is sufficient to adjust the grapple 100 position over a log(s) for grasping the log(s). Alternatively, a swivel system may be provided to rotate/swivel a greater amount, even 360 degrees.

The hydraulic motor 74 receives hydraulic fluid from either one of the two three-way solenoid valves 57, 58, as discussed above, via hydraulic lines 78, 79 (see FIGS. 9 and 10). As may be seen in FIG. 9, the hydraulic fluid flow enters the motor 74 from opposite directions, and the bi-directional motor therefore turns in opposite directions, depending on which of the valves 57, 58 is supplying the fluid. When the yarder 10 operator determines that the grapple 100 needs to be turned, he presses the first transmitter button a second time (see Step 2 above) which activates three-way solenoid valve 57 to direct hydraulic fluid to the motor to rotate the grapple 100 in one direction; if the operator sees that the grapple 100 needs to be rotated in the opposite direction (see Step 3 above) the first button is pressed a third time, and a signal activates the other solenoid valve 58 to direct hydraulic fluid to the motor in the opposite direction.

Other systems for mounting and rotating/swiveling the grapple may be used, as may be understood by one of skill in the art, after reading this Description and viewing the Drawings. Preferred systems will allow the grapple assembly to pivot or "swing" generally parallel to the skyline, which can be beneficial when the carriage and grapple are being lowered over a log. As the grapple contacts the log(s), it may bump or slide along the log, in which case pivoting relative to the carriage may minimize impact on, and movement of, the carriage. Further, preferred systems allow at least some rotation of the grapple assembly on its axis (which is generally vertical when the grapple is suspended from the carriage).

Once the grapple is properly positioned around a log, the grapple is closed by tightening of the towline 18. Towline 18 extends from the first wheel 48 on the bottom surface of the bottom wall 22 of the carriage housing, through the towline brake 54, over the second wheel 50, over axle 112, and down through aperture 131 that extends through the plates 116, 120, and 130 (see FIGS. 7 and 15). From this aperture 131, towline 18 winds through spaced-apart pulleys 136, 138, and 140, which are mounted on extensions 134. Preferably, the middle pulley 136 is 15 rotatably mounted on a pivot 142. The towline cable 18 passes underneath the middle pulley 136, over and around one of the side pulleys 138 (on grapple arm 129), and over and around the other side pulley 140 (on grapple arm 128), and then is fixed to grapple arm 129 at securement point 141. Of course, the towline 18 may be looped differently so that the towline 18 would secure at its distal end to grapple arm 128, and pulley configurations other than those shown may be used to provide the force required to hold the grapple closed around a log.

In the preferred embodiment, the grapple arms 128, 129 are biased open by a spring 132, holding the arms 128, 129 apart against the force of their weight. The spring 132 keeps the arms 128, 129 continuously open unless closed via an outside mechanism such as the preferred towline and pulley system; this allows the arms 128, 129 to be fitted over a log without having to open them first and without using other power to open them. In the preferred embodiment, there is a safety chain 144 that connects one arm 129 with the upper portion of the extension plate 134. The safety chain 144 may be connected with either arm.

As discussed above, after the towline brake 54 is released and the skyline brake 34 is applied, the yarder 10 operator reels in the towline 18; the tensioning of the towline cable 18 will elevate the center pivot 142 and pull the grapple arms 128, 129 toward each other (see FIG. 14) to close the grapple arms 128, 129 sufficiently around a log to capture it for lifting and transport. In the preferred embodiment, the grapple arms 128, 129 open up to an extent that the distal extremities of the arms are seven feet apart, and close to an extent that the distal extremities of the arms are only about four inches apart.

The logging system described above, and drawn in the Figures, may be effective for retrieving log(s) from any portion of the valley/canyon slope nearer the yarder, and for the bottom of the valley/canyon, as gravity assists in lowering the carriage to these locations. In an alternative embodiment, the logging system 200 may be fitted with a haulback line to allow the operator to log both sides of a canyon, that is, to "haul" the carriage up the opposite slope (for example, see the haulback line illustrated at http://www.fao.org/docrep/X0622E/x0622e15.htm). However, the addition of the haulback line would require a third drum on the yarder, increasing the overall cost of the logging system. Preferably, even with the addition of the third line, the grapple would still be closed using the towline.

Although this invention has been described above with reference to particular means, materials and embodiments, it is to be understood that the invention is not limited to these disclosed particulars, but extends instead to all equivalents within the scope of the following claims.

I claim:

1. A logging system comprising:
a skyline cable for extending between a landing and a securement device at a distance from the landing;
a towline cable;
a carriage riding on said skyline cable;
a grapple suspended from said carriage, wherein said grapple has an opened and a closed position;
the towline cable being connected to said grapple, and adapted to move the grapple from said open position to said closed position in addition to being adapted to pull the carriage to the landing;
wherein the carriage comprises a hydraulic skyline brake configured to stop movement of the carriage relative to the skyline, a hydraulic towline brake configured to stop movement of the towline relative to the carriage, and a hydraulic fluid system configured to automatically release said skyline brake when said towline brake is applied and to automatically release said towline brake when said skyline brake hydraulic is applied;
wherein the skyline brake and the towline brake each comprise a hydraulic ram, and the hydraulic fluid system comprises a double-solenoid valve that directs hydraulic fluid flow to the rams of both the skyline brake and the towline brake to both shorten and length said rams, said double-solenoid valve being controlled by a radio control device comprising a transmitter at said landing and a receiver in the carriage;
wherein the carriage further comprises an electronics unit operatively connecting the receiver to said double-solenoid valve to release the skyline brake and apply the towline brake upon a towline-braking-signal from the transmitter to said receiver;
wherein the carriage further comprises a bi-directional hydraulic motor, a first motor solenoid valve and a second motor solenoid valve which are both supplied with hydraulic fluid from the lengthening chamber of the towline brake ram when said towline brake is applied in response to said towline-braking signal; and
said electronics unit comprises a first relay, a second relay, and a sequence-relay;
wherein said first relay is configured to direct current, in response to said towline-braking signal, to the double-solenoid valve to release said skyline brake and apply the towline brake and also to direct current to the sequence relay;
wherein said sequence relay is configured to direct current to the first motor solenoid valve in response to a first transmission of the towline-braking signal from the transmitter to the receiver, and to direct current to the second motor solenoid valve upon a second transmission of the towline-braking signal from the transmitter to the receiver; and
wherein the first motor solenoid valve is adapted to direct hydraulic fluid to the motor in a first direction to rotate the grapple, and wherein the second motor solenoid valve is adapted to direct hydraulic fluid to the motor in a second direction to rotate the grapple in a reverse direction.

2. A logging system as in claim 1, wherein said sequence relay is configured to again direct current to the first motor solenoid valve in response to a third transmission of the towline-braking signal from the transmitter to the receiver.

3. A logging system as in claim 2, wherein said electronics unit is configured to direct current to said double-solenoid to apply the skyline brake and release the towline brake upon a skyline-braking signal from the transmitter to the receiver.

4. A logging system as in claim 3, further comprising a towline winch at the landing that tightens the towline when said skyline brake is applied and said towline brake is released, and wherein said tightening of the towline moves the grapple into the closed position.

5. A logging system as in claim 4, wherein the electronics unit is configured to direct current to the double-solenoid valve, upon a fourth transmission of the towline-braking signal from the transmitter to the receiver after grapple is in the closed position, to apply the towline brake and release the skyline brake so that the grapple is locked in said closed position for capturing a log in the grapple.

6. A logging system as in claim 5, wherein said transmitter comprises a first control button and a second control button, and said transmitter is configured so that said towline-braking signal is transmitted to the receiver by a user pressing said first control button, and wherein said skyline-braking signal is transmitted to the receiver by the user pressing said second control button.

7. A logging system comprising:
a yarder comprising a first winch and a second winch;
a skyline attached to said first winch at a first end and attached to a securing support at a second end;
a carriage riding on said skyline, wherein said carriage comprises an electrical system and a hydraulic system comprising a double-solenoid valve, two hydraulic rams, and a hydraulic motor;
a grapple suspended from said carriage;
a towline connected to said second winch at a first end and to said grapple at a second end;
a skyline brake and a towline brake on said carriage;
a remote control device comprising a two-function radio on said yarder, and a receiver on or in said carriage controlling said electrical system, wherein the remote control device signals said double-solenoid valve to control hydraulic fluid pressure supply to one of said two hydraulic rams to apply the skyline brake, to the other of said two hydraulic rams to apply the towline brake, and to the hydraulic motor to rotate the grapple; and wherein said remote control device, electrical system, and hydraulic system are configured so that:

when a first button on said two-function radio is pressed a first time, a first signal causes the double-solenoid valve to release the skyline brake and apply the towline brake;

when said first button is pressed a second time, said hydraulic motor rotates the grapple in one direction;

when said first button is pressed a third time, said hydraulic motor rotates the grapple in an opposing direction; and when a second button on said two-function radio is pressed a first time, a second signal causes the double-solenoid valve to apply the skyline brake and release the towline brake.

8. A logging system as in claim 7, wherein, when the towline brake is released, tightening the towline with the second winch closes the grapple.

9. A logging system as in claim 7, comprising only two winches which are said first winch and said second winch.

10. A method of operating a logging system comprising:
providing a yarder comprising a first winch and a second winch positioned near a landing;

attaching a skyline to said yarder at a first end and to a securing support at a second end;

providing a carriage rolling on said skyline and having a grapple suspended from said carriage;

providing a towline connected to said second winch at a first end and to said grapple at a second end; and providing a skyline brake and a towline brake on said carriage;

releasing the skyline brake and applying the towline brake so that the carriage rolls down the skyline toward a log and pulls the towline out from the second winch;

rotating the grapple on a generally vertical axis of the grapple as the carriage is rolling down the skyline;

applying the skyline brake and releasing the towline brake when the carriage is positioned over a log, and closing the grapple around the log by tightening the towline; and applying the towline brake and releasing the skyline brake and then reeling in the towline with the second winch to pull the carriage back to the landing.

11. A method of operating a logging system comprising:
providing a yarder comprising a first winch and a second winch positioned near a landing;

attaching a skyline to said yarder at a first end and to a securing support at a second end;

providing a carriage rolling on said skyline and having a grapple suspended from said carnage;

providing a towline connected to said second winch at a first end and to said grapple at a second end; and providing a skyline brake and a towline brake on said carriage;

releasing the skyline brake and applying the towline brake so that the carriage rolls down the skyline toward a log and pulls the towline out from the second winch;

applying the skyline brake and releasing the towline brake when the carriage is positioned over a log, and closing the grapple around the log by tightening the towline with said second winch; and applying the towline brake and releasing the skyline brake and then reeling in the towline with the second winch to pull the carriage back to the landing; and wherein:

a remote control transmitter is provided on the yarder and a receiver is provided on the carnage;

said releasing the skyline brake and applying the towline brake are done by pressing a first button on the remote control transmitter a first time;

said applying the skyline brake and releasing the towline brake are done by pressing a second button on the remote control a first time; and further comprising rotating the grapple on a generally vertical axis by pressing said first button a second time.

12. A method as in claim 11, further comprising rotating the grapple in a reverse direction by pressing said first button a third time.

* * * * *